United States Patent
Hillman et al.

(10) Patent No.: US 10,852,520 B2
(45) Date of Patent: Dec. 1, 2020

(54) THREE-DIMENSIONAL IMAGING USING SWEPT, CONFOCALLY ALIGNED PLANAR EXCITATION AND A CUSTOMIZED IMAGE SPLITTER

(71) Applicant: The Trustees of Columbia University in the City of New York, New York, NY (US)

(72) Inventors: Elizabeth M. C. Hillman, New York, NY (US); Kripa B. Patel, Salem, NH (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 16/333,380

(22) PCT Filed: Sep. 12, 2017

(86) PCT No.: PCT/US2017/051192
§ 371 (c)(1),
(2) Date: Mar. 14, 2019

(87) PCT Pub. No.: WO2018/052905
PCT Pub. Date: Mar. 22, 2018

(65) Prior Publication Data
US 2019/0250388 A1    Aug. 15, 2019

Related U.S. Application Data

(60) Provisional application No. 62/397,275, filed on Sep. 20, 2016, provisional application No. 62/395,812, filed on Sep. 16, 2016.

(51) Int. Cl.
*G02B 21/00* (2006.01)
*G02B 21/36* (2006.01)
(Continued)

(52) U.S. Cl.
CPC ........ *G02B 21/0048* (2013.01); *G01J 3/2803* (2013.01); *G01J 3/36* (2013.01);
(Continued)

(58) Field of Classification Search
CPC ................ G02B 21/00; G02B 21/0032; G02B 21/0052; G02B 21/0064; G02B 21/0036; G02B 21/0048; G02B 21/367
See application file for complete search history.

(56) References Cited

U.S. PATENT DOCUMENTS

| | | | |
|---|---|---|---|
| 5,266,803 | A | 11/1993 | Heffelfinger |
| 5,485,530 | A | 1/1996 | Lakowicz et al. |

(Continued)

FOREIGN PATENT DOCUMENTS

| | | |
|---|---|---|
| EP | 1615009 A1 | 1/2006 |
| WO | 2015109323 A2 | 7/2015 |

(Continued)

OTHER PUBLICATIONS

Ahrens et al., "Whole-brain functional imaging at cellular resolution using lightsheet microscopy", Nature Methods, Mar. 18, 2013, vol. 10(5): p. 413-420 (Abstract).

(Continued)

*Primary Examiner* — Jonathan M Hansen
(74) *Attorney, Agent, or Firm* — Potomac Law Group, PLLC

(57) ABSTRACT

In a first invention, a SCAPE system routes light from a tilted intermediate image plane (170) to an infinity space disposed behind a third objective (180). A first dichroic beam splitter (52) positioned in the infinity space routes light from the intermediate image plane with different wavelengths in different directions. First and second light detector arrays (90) capture first and second wavelength images, respectively, and optical components (54,56,58,82) route (Continued)

light having the first and second wavelengths towards the first and second light detectors, respectively. In a second invention, a SCAPE system is used to capture a plurality of images while a sample is perturbed (e.g., vibrated, deformed, pushed, pulled, stretched, or squeezed) in order to visualize the impact of the perturbation on the sample.

20 Claims, 7 Drawing Sheets

(51) Int. Cl.
*G01J 3/36* (2006.01)
*G01J 3/28* (2006.01)

(52) U.S. Cl.
CPC ..... *G02B 21/0032* (2013.01); *G02B 21/0036* (2013.01); *G02B 21/0064* (2013.01); *G02B 21/0076* (2013.01); *G02B 21/367* (2013.01); *G01J 2003/2826* (2013.01)

(56) References Cited

U.S. PATENT DOCUMENTS

| | | | |
|---|---|---|---|
| 7,710,115 | B2 | 5/2010 | Hargreaves |
| 8,254,020 | B2 | 8/2012 | Holy et al. |
| 8,290,358 | B1 | 10/2012 | Georgiev |
| 8,441,633 | B2 | 5/2013 | Truong et al. |
| 8,575,570 | B2 | 11/2013 | Choi et al. |
| 8,585,570 | B2 | 11/2013 | Gleim et al. |
| 8,619,237 | B2 | 12/2013 | Hillman et al. |
| 8,679,426 | B2 | 3/2014 | Barrett |
| 8,718,351 | B2 | 5/2014 | So et al. |
| 9,357,202 | B2 | 5/2016 | Pavani et al. |
| 9,655,523 | B2 | 5/2017 | Hillman et al. |
| 10,061,111 | B2 | 8/2018 | Hillman |
| 2003/0142934 | A1 | 7/2003 | Pan et al. |
| 2010/0090127 | A1 | 4/2010 | Yekta et al. |
| 2012/0140240 | A1 | 6/2012 | Hillman et al. |
| 2012/0281264 | A1 | 11/2012 | Lippert et al. |
| 2014/0036042 | A1* | 2/2014 | Xia ............ G02B 21/361 348/49 |
| 2015/0042992 | A1 | 2/2015 | Cui et al. |
| 2016/0213252 | A1 | 7/2016 | Hillman et al. |
| 2016/0327779 | A1 | 11/2016 | Hillman |
| 2018/0139366 | A1* | 5/2018 | Narasimhan ....... A61B 1/00193 |
| 2018/0214024 | A1 | 8/2018 | Hillman et al. |
| 2019/0167081 | A1 | 6/2019 | Hillman |
| 2019/0196172 | A1 | 6/2019 | Hillman |
| 2019/0250388 | A1 | 8/2019 | Hillman et al. |
| 2019/0278073 | A1 | 9/2019 | Hillman et al. |

FOREIGN PATENT DOCUMENTS

| | | |
|---|---|---|
| WO | 2017015077 A1 | 1/2017 |
| WO | 2017210159 A1 | 12/2017 |
| WO | 2017210182 A1 | 12/2017 |
| WO | 2018013489 A1 | 1/2018 |
| WO | 2018052905 A1 | 3/2018 |
| WO | 2018064149 A1 | 4/2018 |
| WO | 2018089865 A1 | 5/2018 |

OTHER PUBLICATIONS

Bouchard et al., "Swept confocally-aligned planar excitation (SCAPE) microscopy for high-speed volumetric Imaging of behaving organisms", Nature Photonics, Jan. 19, 2015, vol. 9(2), pp. 113-119.
Bouchard et al., "Swept confocally-aligned planar excitation (SCAPE) microscopy for high-speed volumetric Imaging of behaving organisms—Supplementary Informatioon", Nature Photonics, Jan. 19, 2015, vol. 9(2), pp. 1-22.
Dean et al.,"Deconvolution-free Subcellular Imaging with Axially Swept Light Sheet Microscopy", Biophysics Journal, vol. 108, Issue 12, pp. 2807-2815, Jun. 2015.
Greb, "Infinity Optical Systems", Optik & Photonik, Feb. 1, 2016, vol. 11(1), pp. 34-37.
Holekamp et al., "Fast Three-Dimensional Fluorescence Imaging of Activity in Neural Populations by Objective-Coupled Planar Illumination Microscopy", Neuron, Mar. 13, 2008, vol. 57, pp. 661-672.
International Preliminary Report and Written Opinion for International Application No. PCT/US2017/051192 dated Mar. 19, 2019.
International Search Report and Written Opinion for International Application No. PCT/US2017/051192 dated Feb. 13, 2018.
Kepshire et al., "A microcomputed tomography guided fluorescence tomography system for small animal molecular Imaging", Review of Scientific Instruments, vol. 80, Issue 4, pp. 043701, Apr. 2009.
Olarte et al., "Decoupled illumination detection in light sheet microscopy for fast volumetric imaging", Optica, Aug. 4, 2015, vol. 2, No. 8, p. 702-705.
Prevedel et al., "Simultaneous whole-animal 3D imaging of neuronal activity using light-field microscopy", Nature Methods, vol. 11, Issue 7, pp. 727-730, May 2014.
Quirin et al., "Calcium imaging of neural circuits with extended depth-of-field light-sheet microscopy", Optics Letters, vol. 41, No. 5, pp. 855-858, Mar. 2016.
Swoger et al., "Light-Sheet-Based Fluorescence Microscopy for Three-Dimensional Imaging of Biological Samples", Adapted from Imaging: A Laboratory Manual (ed. Yuste). CSHL Press, Cold Spring Harbor, NY, USA, Jan. 1, 2011, copyrighted 2014 (downloaded Jun. 5, 2016).
Tomer et al., "SPED light sheet microscopy: fast mapping of biological system structure and function", Cell, vol. 163, Issue 7 (Nov. 2015), pp. 1796-1806.
Truscott et al., "Determining 3D Flow Fields via Multi-camera Light Field Imaging", Journal of Visualized Experiments: Jove, Mar. 6, 2013, vol. 73, p. 4325.
Unknown, "Multichannel System Filter Selection", Photometrics, Jan. 1, 2010, retrieved from the Internet: URL: https://www.photometrics.com/resources/technotes/pdfs/filters_technote.pdf, retrieved on Nov. 22, 2017, pp. 1-3.
Unknown, "ORCA-D2", Hamamatsu Catalog No. SCAS0067E01, Nov. 2009.
Unknown, "Ratio imaging of calcium oscillations in HeLa cells expressing yellow cameleon-3.1", Jan. 1, 2001, retrieved from the Internet: URL:https://www.electronicsdatasheets.com/download/115093.pdf?format=pdf, retrieved on Nov. 23, 2017, two pages.
Communication pursuant to Article 94(3) EPC dated Oct. 19, 2020 issued in EP App. No. 17777696.0.

\* cited by examiner

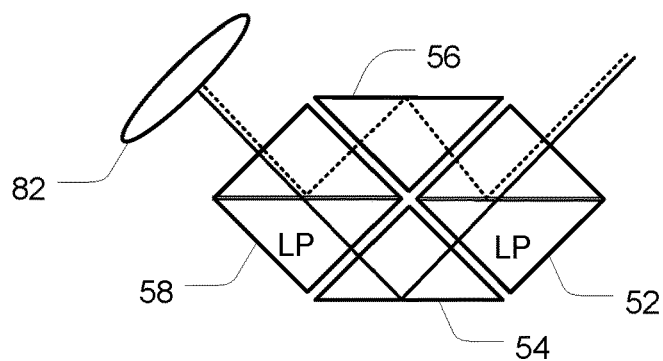
FIG. 9
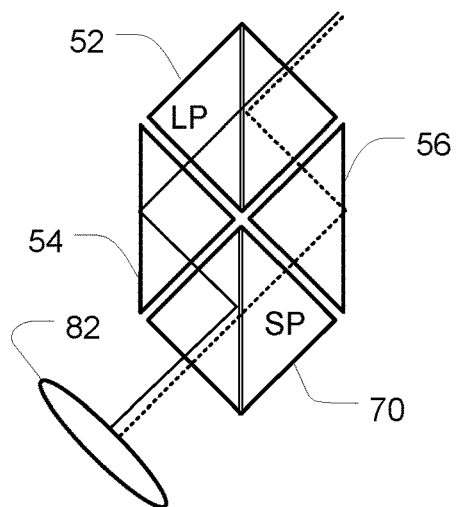
FIG. 10
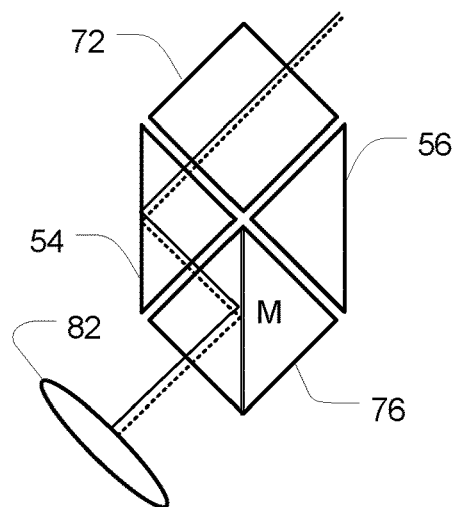
FIG. 12
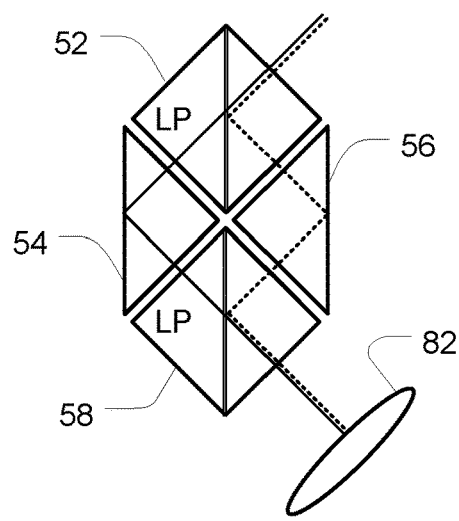
11A
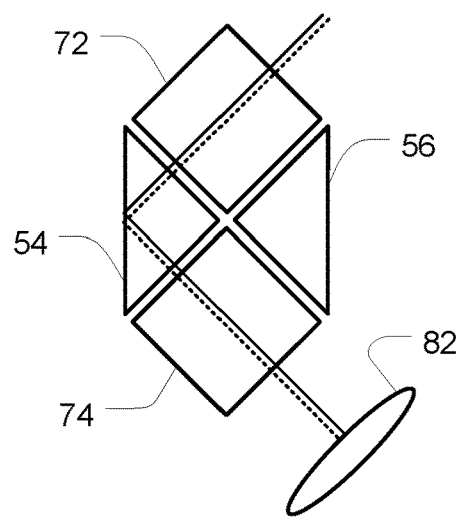
11B

THREE-DIMENSIONAL IMAGING USING SWEPT, CONFOCALLY ALIGNED PLANAR EXCITATION AND A CUSTOMIZED IMAGE SPLITTER

CROSS REFERENCE TO RELATED APPLICATIONS

This Application is a U.S. national stage filing under 35 U.S.C. § 371 of International Application No. PCT/US2017/051192, filed Sep. 12, 2017, which claims the benefit of U.S. Provisional Application 62/395,812, filed Sep. 16, 2016, and U.S. Provisional Application 62/397,275, filed Sep. 20, 2016, each of which is incorporated herein by reference in its entirety.

STATEMENT REGARDING FEDERALLY-SPONSORED RESEARCH

This invention was made with government support under grants NS094296, NS076628, NS063226, and NS053684 awarded by the National Institutes of Health. The Government has certain rights in this invention.

FIELD

The present invention relates to microscopy.

BACKGROUND

A 3-dimensional imaging system called swept, confocally-aligned planar excitation (SCAPE) microscopy has been developed and described in WO 2015/109323 and US 2016/0327779, each which is incorporated herein by reference in its entirety. The SCAPE system forms three dimensional microscopic images at high speed by scanning excitation light and de-scanning image light onto a light detector such that multiple depths of the sample are detected at each instant.

SUMMARY OF THE INVENTION

One aspect of the invention is directed to a first imaging apparatus. The first imaging apparatus comprises a first set of optical components having a proximal end and a distal end, wherein the first set of optical components includes a first objective disposed at the distal end of the first set of optical components. The first imaging apparatus also comprises a second set of optical components having a proximal end and a distal end, wherein the second set of optical components includes a second objective disposed at the distal end of the second set of optical components. The first imaging apparatus also comprises a scanning element that is disposed proximally with respect to the proximal end of the first set of optical components and proximally with respect to the proximal end of the second set of optical components. The scanning element is arranged to route a sheet of excitation light so that the sheet of excitation light will pass through the first set of optical components in a proximal to distal direction and project into a sample that is positioned distally beyond the distal end of the first set of optical components, wherein the sheet of excitation light is projected into the sample at an oblique angle, and wherein the sheet of excitation light is projected into the sample at a position that varies depending on an orientation of the scanning element. The first set of optical components routes detection light from the sample in a distal to proximal direction back to the scanning element. The scanning element is also arranged to route the detection light so that the detection light will pass through the second set of optical components in a proximal to distal direction and form an intermediate image plane at a position that is distally beyond the distal end of the second set of optical components. The first imaging apparatus also comprises a third objective arranged to route light arriving from the intermediate image plane to an infinity space, wherein the intermediate image plane is disposed in front of the third objective and the infinity space is disposed behind the third objective. The first imaging apparatus also comprises a first beam splitter positioned in the infinity space, wherein the first beam splitter is arranged to route light from the intermediate image plane having a first wavelength in a first direction and to route light from the intermediate image plane having a second wavelength in a second direction, wherein the second direction is different from the first direction, and wherein the first wavelength is longer than the second wavelength. The first imaging apparatus also comprises a first light detector array arranged to capture first-wavelength images and a second light detector array arranged to capture second-wavelength images. The first imaging apparatus also comprises a third set of optical components arranged to route the light having the first wavelength that exits the first beam splitter towards the first light detector array and route the light having the second wavelength that exits the first beam splitter towards the second light detector array.

In some embodiments of the first imaging apparatus, the first light detector array and the second light detector array are implemented on different light detector chips. In some embodiments of the first imaging apparatus, the first light detector array and the second light detector array are implemented on separate regions of a single light detector chip.

In some embodiments of the first imaging apparatus, the third set of optical components includes a second beam splitter, a first steering mirror arranged to route the light having the first wavelength that exits the first beam splitter into the second beam splitter, a second steering mirror arranged to route the light having the second wavelength that exits the first beam splitter into the second beam splitter, and at least one lens disposed between (a) the second beam splitter and (b) the first and second light detector arrays. In these embodiments, the second beam splitter is arranged to route light arriving from the first and second steering mirrors towards the at least one lens.

In some of these embodiments, the first beam splitter comprises a long-pass dichroic element that passes light at the first wavelength without diverting its path, and redirects light at the second wavelength in the second direction; and the second beam splitter comprises a long-pass dichroic element that passes light at the first wavelength without diverting its path, and redirects light at the second wavelength arriving from the second steering mirror towards the at least one lens. Optionally, each of the first beam splitter and the second beam splitter are implemented in a respective movable module, and the apparatus further comprises (i) a first optical block, (ii) a mechanism for moving the first beam splitter out of a first optical path and moving the first optical block into the first optical path; (iii) a second optical block, and (iv) a mechanism for moving the second beam splitter out of a second optical path and moving the second optical block into the second optical path.

In some of these embodiments, the first beam splitter comprises a long-pass dichroic element that passes light at the first wavelength without diverting its path, and redirects light at the second wavelength in the second direction; and the second beam splitter comprises a short-pass dichroic element that passes light at the second wavelength without diverting its path, and redirects light at the first wavelength arriving from the first steering mirror towards the at least one lens. Optionally, each of the first beam splitter and the second beam splitter are implemented in a respective movable module; and the apparatus further comprises (i) a first optical block, (ii) a mechanism for moving the first beam splitter out of a first optical path and moving the first optical block into the first optical path; (iii) a second optical block comprising a mirror, and (iv) a mechanism for moving the second beam splitter out of a second optical path and moving the second optical block into the second optical path.

In some of these embodiments, at least one of the first and second steering mirrors has an orientation that is adjustable. Optionally, at least one of the first and second steering mirrors has a position that is adjustable. Optionally, the first light detector array and the second light detector array are implemented on separate regions of a single light detector chip.

In some of these embodiments, light that exits the second beam splitter deviates by less than 30° from a plane defined by (a) an optical axis of the first set of optical components and (b) an optical axis of the second set of optical components. In some of these embodiments, light that exits the second beam splitter deviates by less than 15° from a plane defined by (a) an optical axis of the first set of optical components and (b) an optical axis of the second set of optical components. In some of these embodiments, light that exits the second beam splitter is perpendicular, ±30°, to a plane defined by (a) an optical axis of the first set of optical components and (b) an optical axis of the second set of optical components. In some of these embodiments, light that exits the second beam splitter is perpendicular, ±15°, to a plane defined by (a) an optical axis of the first set of optical components and (b) an optical axis of the second set of optical components.

In some of these embodiments, each of the first beam splitter and the second beam splitter are implemented in a respective removable magnetically-mounted module.

In some embodiments of the first imaging apparatus, the first beam splitter is implemented in a removable magnetically-mounted module.

Some embodiments of the first imaging apparatus further comprise a light sheet generator that expands light from a light source into the sheet of excitation light; and a supplementary beam splitter disposed between the proximal end of the second set of optical components and the scanning element. In these embodiments, the supplementary beam splitter is arranged to route the sheet of excitation light, which arrives from the light sheet generator, towards the scanning element, and the supplementary beam splitter is arranged to route the detection light, which arrives from the scanning element, into the proximal end of the second set of optical components. In some of these embodiments the light sheet generator comprises a light source and at least one of (a) a cylindrical lens arranged to expand light from the light source into the sheet of excitation light; (b) an aspheric mirror arranged to expand light from the light source into the sheet of excitation light; (c) a spatial light modulator arranged to expand light from the light source into the sheet of excitation light; (d) a second scanning element arranged to expand light from the light source into the sheet of excitation light; and (e) an oscillating galvanometer mirror arranged to expand light from the light source into the sheet of excitation light.

Some embodiments of the first imaging apparatus further comprise a light sheet generator that expands light from a light source into the sheet of excitation light. In these embodiments, the second set of optical components is arranged to route the sheet of excitation light, which arrives from the light sheet generator, in a distal to proximal direction towards the scanning element. In some of these embodiments, the light sheet generator comprises a light source and at least one of (a) a cylindrical lens arranged to expand light from the light source into the sheet of excitation light; (b) an aspheric mirror arranged to expand light from the light source into the sheet of excitation light; (c) a spatial light modulator arranged to expand light from the light source into the sheet of excitation light; (d) a second scanning element arranged to expand light from the light source into the sheet of excitation light; and (e) an oscillating galvanometer mirror arranged to expand light from the light source into the sheet of excitation light.

In some embodiments of the first imaging apparatus, the intermediate image plane is stationary. In some embodiments of the first imaging apparatus, the first wavelength corresponds to red light, and the second wavelength corresponds to green light.

Another aspect of the invention is directed to a second imaging apparatus. The second imaging apparatus comprises an optical system that (a) projects a sheet of excitation light into a sample at an oblique angle, wherein a position of the sheet of excitation light within the sample varies depending on an orientation of a scanning element, and (b) forms, from detection light that originates from the position of the sheet of excitation light, an image at an intermediate image plane, wherein the intermediate image plane remains stationary regardless of the orientation of the scanning element. The second imaging apparatus also comprises a third objective arranged to route light arriving from the intermediate image plane to an infinity space, wherein the intermediate image plane is disposed in front of the third objective and the infinity space is disposed behind the third objective. The second imaging apparatus also comprises a first beam splitter positioned in the infinity space, wherein the first beam splitter is arranged to route light from the intermediate image plane having a first wavelength in a first direction and to route light from the intermediate image plane having a second wavelength in a second direction, wherein the second direction is different from the first direction and wherein the first wavelength is longer than the second wavelength. The second imaging apparatus also comprises a first light detector array arranged to capture first-wavelength images; a second light detector array arranged to capture second-wavelength images; and a third set of optical components arranged to route the light having the first wavelength that exits the first beam splitter towards the first light detector array and route the light having the second wavelength that exits the first beam splitter towards the second light detector array.

In some embodiments of the second imaging apparatus, the first light detector array and the second light detector array are implemented on different light detector chips. In some embodiments of the second imaging apparatus, the first light detector array and the second light detector array are implemented on separate regions of a single light detector chip.

In some embodiments of the second imaging apparatus, the third set of optical components includes: a second beam splitter; a first steering mirror arranged to route the light having the first wavelength that exits the first beam splitter into the second beam splitter; a second steering mirror arranged to route the light having the second wavelength that exits the first beam splitter into the second beam splitter; and at least one lens disposed between (a) the second beam splitter and (b) the first and second light detector arrays. In these embodiments, the second beam splitter is arranged to route light arriving from the first and second steering mirrors towards the at least one lens.

In some of these embodiments, the first beam splitter comprises a long-pass dichroic element that passes light at the first wavelength without diverting its path, and redirects light at the second wavelength in the second direction. In these embodiments, the second beam splitter comprises a long-pass dichroic element that passes light at the first wavelength without diverting its path, and redirects light at the second wavelength arriving from the second steering mirror towards the at least one lens. Optionally, in these embodiments, each of the first beam splitter and the second beam splitter are implemented in a respective movable module, and the apparatus further comprises (i) a first optical block, (ii) a mechanism for moving the first beam splitter out of a first optical path and moving the first optical block into the first optical path; (iii) a second optical block, and (iv) a mechanism for moving the second beam splitter out of a second optical path and moving the second optical block into the second optical path.

In some of these embodiments, the first beam splitter comprises a long-pass dichroic element that passes light at the first wavelength without diverting its path, and redirects light at the second wavelength in the second direction; and the second beam splitter comprises a short-pass dichroic element that passes light at the second wavelength without diverting its path, and redirects light at the first wavelength arriving from the first steering mirror towards the at least one lens. Optionally, in these embodiments, each of the first beam splitter and the second beam splitter are implemented in a respective movable module, and the apparatus further comprises (i) a first optical block, (ii) a mechanism for moving the first beam splitter out of a first optical path and moving the first optical block into the first optical path; (iii) a second optical block comprising a mirror, and (iv) a mechanism for moving the second beam splitter out of a second optical path and moving the second optical block into the second optical path.

In some of these embodiments, at least one of the first and second steering mirrors has an orientation that is adjustable. Optionally, in these embodiments, at least one of the first and second steering mirrors has a position that is adjustable. Optionally, in these embodiments, the first light detector array and the second light detector array are implemented on separate regions of a single light detector chip.

In some of these embodiments, light that exits the second beam splitter deviates by less than 30° from a plane defined by (a) an optical axis of the excitation light and (b) an optical axis of the detection light. In some of these embodiments, the light that exits the second beam splitter deviates by less than 15° from a plane defined by (a) an optical axis of the excitation light and (b) an optical axis of the detection light. In some of these embodiments, the light that exits the second beam splitter is perpendicular, ±30°, to a plane defined by (a) an optical axis of the excitation light and (b) an optical axis of the detection light. In some of these embodiments, the light that exits the second beam splitter is perpendicular, ±15°, to a plane defined by (a) an optical axis of the excitation light and (b) an optical axis of the detection light.

In some of these embodiments, each of the first beam splitter and the second beam splitter are implemented in a respective removable magnetically-mounted module.

In some embodiments of the second imaging apparatus, the first beam splitter is implemented in a removable magnetically-mounted module.

Another aspect of the invention is directed to a third imaging apparatus. The third imaging apparatus comprises a first set of optical components having a proximal end and a distal end, wherein the first set of optical components includes a first objective disposed at the distal end of the first set of optical components. The third imaging apparatus also comprises a second set of optical components having a proximal end and a distal end, wherein the second set of optical components includes a second objective disposed at the distal end of the second set of optical components. The third imaging apparatus also comprises a scanning element that is disposed proximally with respect to the proximal end of the first set of optical components and proximally with respect to the proximal end of the second set of optical components. The scanning element is arranged to route a sheet of excitation light so that the sheet of excitation light will pass through the first set of optical components in a proximal to distal direction and project into a sample that is positioned distally beyond the distal end of the first set of optical components, wherein the sheet of excitation light is projected into the sample at an oblique angle, and wherein the sheet of excitation light is projected into the sample at a position that varies depending on an orientation of the scanning element. The first set of optical components routes detection light from the sample in a distal to proximal direction back to the scanning element. The scanning element is also arranged to route the detection light so that the detection light will pass through the second set of optical components in a proximal to distal direction and form an intermediate image plane at a position that is distally beyond the distal end of the second set of optical components. The third imaging apparatus also comprises an actuator configured to perturb the sample while the sheet of excitation light is projected into the sample at a plurality of positions that correspond, respectively, to a plurality of different orientations of the scanning element; and a light detector array arranged to capture a plurality of images of the intermediate image plane that correspond, respectively, to the plurality of different orientations of the scanning element.

In some embodiments of the third imaging apparatus, the actuator comprises a vibrator. In some embodiments of the third imaging apparatus, the actuator comprises at least one of an audio frequency transducer and an ultrasound frequency transducer. In some embodiments of the third imaging apparatus, the actuator is configured to deform, push, pull, stretch, or squeeze the sample.

Another aspect of the invention is directed to a fourth imaging apparatus. The fourth imaging apparatus comprises an optical system that (a) projects a sheet of excitation light into a sample at an oblique angle, wherein a position of the sheet of excitation light within the sample varies depending on an orientation of a scanning element, and (b) forms, from detection light that originates from the position of the sheet of excitation light, an image at an intermediate image plane, wherein the intermediate image plane remains stationary regardless of the orientation of the scanning element. The fourth imaging apparatus also comprises an actuator configured to perturb the sample while the sheet of excitation light is projected into the sample at a plurality of positions that correspond, respectively, to a plurality of different orientations of the scanning element. The fourth imaging apparatus also comprises a light detector array arranged to capture a plurality of images of the intermediate image plane that correspond, respectively, to the plurality of different orientations of the scanning element.

In some embodiments of the fourth imaging apparatus, the actuator comprises a vibrator. In some embodiments of the fourth imaging apparatus, the actuator comprises at least one of an audio frequency transducer and an ultrasound frequency transducer. In some embodiments of the fourth imaging apparatus, the actuator is configured to deform, push, pull, stretch, or squeeze the sample.

Another aspect of the invention is directed to a first method of imaging a sample. The first method comprises projecting a sheet of excitation light into a sample at an oblique angle, wherein a position of the sheet of excitation light within the sample varies depending on an orientation of a scanning element; forming, from detection light that originates from the position of the sheet of excitation light, an image at an intermediate image plane, wherein the intermediate image plane remains stationary regardless of the orientation of the scanning element; perturbing the sample while the sheet of excitation light is projected into the sample at a plurality of positions that correspond, respectively, to a plurality of different orientations of the scanning element; and capturing a plurality of images of the intermediate image plane that correspond, respectively, to the plurality of different orientations of the scanning element.

In some embodiments of the first method, the perturbing comprises vibrating. In some embodiments of the first method, the perturbing comprises perturbing at an audio frequency or an ultrasound frequency. In some embodiments of the first method, the perturbing comprises at least one of pushing, pulling, stretching, or squeezing the sample.

Another aspect of the invention is directed to a fifth imaging apparatus. The fifth imaging apparatus comprises a light source; at least one optical component that generates a sheet of light from the light source; a beam splitter disposed in a path of the sheet of light; a scanning mirror disposed in a path of the sheet of light; a first telescope having a proximal end and a distal end, and a first objective disposed at the distal end of the first telescope; and a second telescope having a proximal end and a distal end, and a second objective disposed at the distal end of the second telescope. The beam splitter routes the sheet of light towards the scanning mirror, and the scanning mirror routes the sheet of light into the proximal end of the first telescope. The first telescope routes the sheet of light in a proximal to distal direction through the first objective into a sample, accepts return light from the sample through the first objective and routes the return light in a distal to proximal direction back to the scanning mirror. The scanning mirror routes the return light through the beam splitter and into the proximal end of the second telescope, and the second telescope routes the sheet of light in a proximal to distal direction through the second objective to form a tilted intermediate image plane. The fifth imaging apparatus also comprises a camera optically positioned to capture images at the tilted intermediate image plane; and an actuator configured to perturb the sample.

In some embodiments of the fifth imaging apparatus, the actuator comprises a vibrator. In some embodiments of the fifth imaging apparatus, the actuator comprises at least one of an audio frequency transducer and an ultrasound frequency transducer. In some embodiments of the fifth imaging apparatus, the actuator is configured to deform, push, pull, stretch, or squeeze the sample.

Another aspect of the invention is directed to a second scanning microscope method. The second scanning microscope method comprises providing wide field illumination of a three-dimensional volume; scanning a light redirector through a plurality of positions, wherein the light redirector is adapted to scan light from multiple different depths within the volume and to convey the light to a light detector; storing signals corresponding to light received from in-focus and out-of-focus planes for each of the plurality of positions of the light redirector for multiple in-focus and out-of-focus samples; and reconstructing light for each of multiple planes in the sample by deconvolution of the stored signals.

In some embodiments of the second scanning microscope method, each of the planes forms a diagonal angle with the optical axis of a primary objective used for focusing for at least some of the planes.

BRIEF DESCRIPTION OF THE DRAWINGS

FIG. 9 depicts a modified image splitter configuration that changes the direction of the outgoing light with respect to the FIGS. 3 and 4 image splitters.

FIG. 10 depicts an alternative image splitter in which a short-pass dichroic beam splitter is used as the second beam splitter.

FIG. 11A depicts a reconfigurable embodiment that is similar to the FIG. 6A embodiment.

FIG. 11B depicts the FIG. 11A embodiment operating in a "bypass mode" after both image splitters have been swapped out and replaced with solid glass optical cubes.

FIG. 12 depicts the FIG. 10 embodiment operating in a "bypass mode" after both image splitters have been swapped out and replaced with alternative optical elements.

Various embodiments are described in detail below with reference to the accompanying drawings, wherein like reference numerals represent like elements.

DESCRIPTION OF THE PREFERRED EMBODIMENTS

A variety of embodiments for implementing imaging using swept, confocally aligned planar excitation (SCAPE) are disclosed in WO 2015/109323 and US 2016/0327779, each of which is incorporated herein by reference in its entirety.

Section 1: Elastography Using SCAPE

In many cases, the mechanical properties of cancerous tissues are different from those of normal tissues. In addition, different tissue types/layers etc. often have different mechanical properties. Characterizing tissues as to whether they are normal or cancerous, or characterizing tissues to determine what type of tissue they are (e.g., cartilage, aorta, cervix, heart, etc.) could have important clinical utility, since mechanical changes can precede more gross pathological changes or be used to detect responses to treatment.

Mechanically perturbing a tissue (e.g., by deforming, pushing, pulling, stretching, squeezing, vibration, applying ultrasound, etc.) makes parts of the tissue move. If this movement is imaged (especially in 3D) the mechanical properties of the tissue can be quantified or measured. This has been done using MRI and ultrasound on large tissues, and using optical coherence tomography (OCT) which reveals micro-scale mechanical contrast for things like fresh tissue pathology. But all of those imaging modalities have drawbacks in this context. More specifically, the frame rate using MRI is very low, the resolution and image quality using ultrasound is very low; and the depth of penetration using OCT is low.

Figure 1:
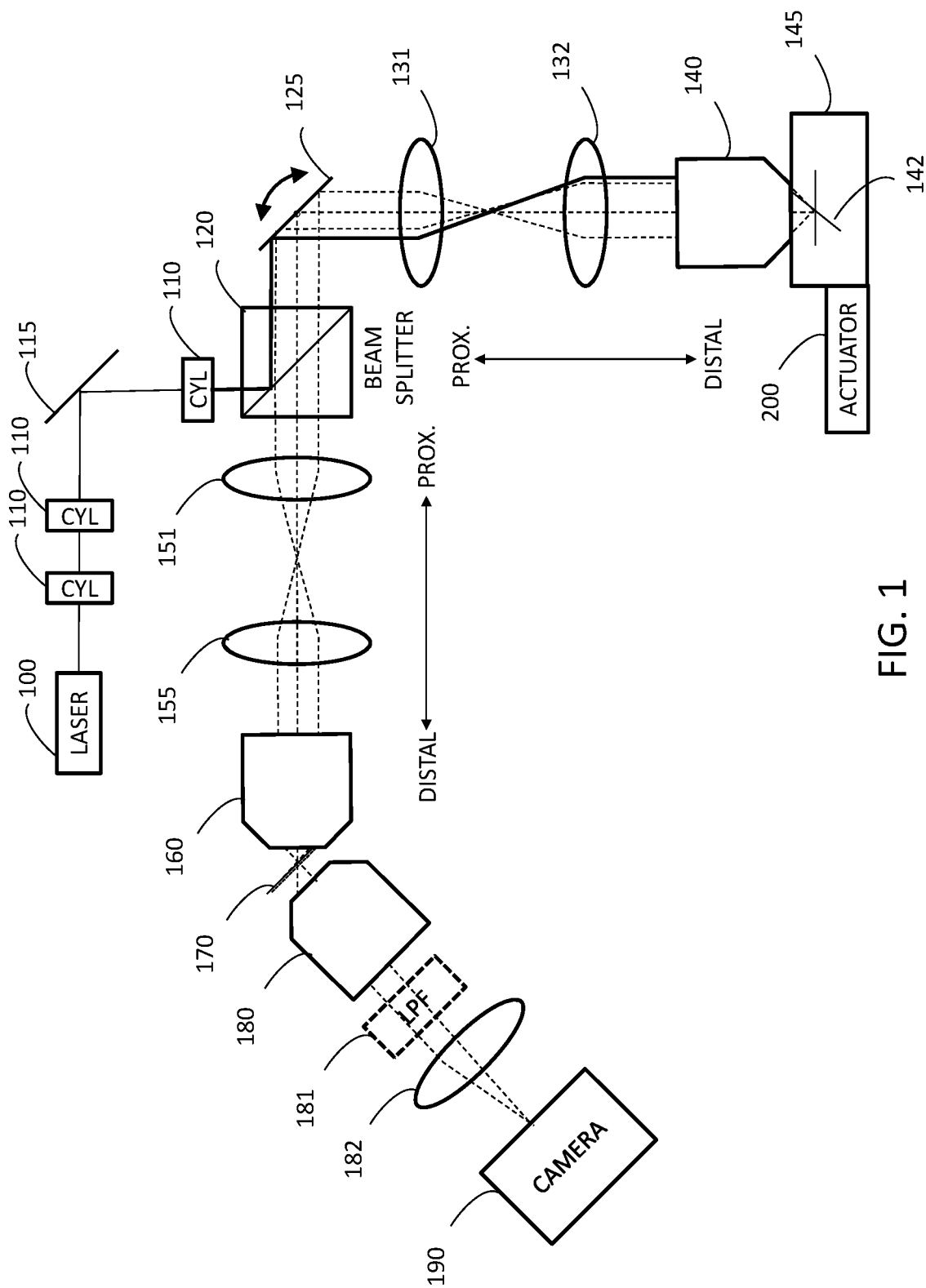
FIG. 1 is a block diagram of a SCAPE system that captures images during perturbation of a sample.

FIG. 1 is a block diagram of a system that uses SCAPE to overcome these drawbacks by capturing good resolution images at a very high frame rate during perturbation of a sample 145.

In the SCAPE portion of the system, light from the light source (e.g., laser 109 or a LED) is routed towards a beam splitter 120 (e.g., a dichroic beam splitter) by one or more routing mirrors 115, and expanded from a pencil beam into a sheet by one or more cylindrical lenses 110. In alternative embodiments (not shown), instead of using the cylindrical lenses 110 to convert the pencil-shaped beam from the light source (e.g., laser 100) into a fan-shaped sheet, a Powell lens or an SLM may be used to perform that function. In alternative embodiments, one of the routing mirrors 115 may be replaced by a galvanometer oriented to scan the pencil shaped beam so as to create a virtual sheet of light. Note that as used herein, the term "sheet of light" includes these virtual sheets of light as well as true sheets of light (e.g., light sheets formed using one or more cylindrical lenses and/or a Powell lens, etc.).

The sheet of light (more accurately, a precursor of a sheet as the sheet is ultimately formed by the first objective 140 as will be understood by those of skill in the art) is reflected by the beam splitter 120 towards a scanning element 125. In some embodiments, this scanning element 125 comprises a rapidly moving galvanometer mirror. In alternative embodiments, the scanning element 125 could be implemented using a rapidly moving prism or any of a variety of alternative designs including MEMS light guides, SLM, etc., that will be apparent to persons skilled in the relevant arts or apparent from the references incorporated above.

After being rerouted by the scanning element 125, the sheet of light continues down the excitation arm in a proximal to distal direction through a first set of optical components (e.g., lenses 131, 132 and first objective 140). The sheet of light then enters the tissue sample 145 at an oblique angle to penetrate a tissue sample along the Z axis, resulting in a sheet of light 142. When the scanning element 125 moves (e.g., due to motion of the galvanometer mirror 125), it causes the position of the sheet of light 142 within the sample to translate. Thus, the position of the sheet of excitation light within the sample varies depending on the orientation of the scanning element 125.

The excitation light may excite fluorescence in the sample 145 or it may simply illuminate the sample, and the illuminated region is imaged. The path of the image light from the sample to the detector first passes through the first set of optical components 131-140 in a distal to proximal direction and back to the scanning element 125. From there, the image light passes through the dichroic beam splitter 120 and into the detection arm. The detection arm includes a second set of optical components (e.g., lenses 151, 155 and second objective 160). The image light passes through these components 151-160 in a proximal to distal direction and forms an intermediate image plane 170. Because the sheet of light entered the sample at an oblique angle, the intermediate image plane corresponding to the section of the sample illuminated by the light sheet 142 will be tilted with respect to the optical axis of lenses 151, 155. One of the advantages of this configuration of SCAPE is that the position of the intermediate image plane 170 remains stationary, regardless of changes in the position of the sheet of light 142 within the sample.

In some embodiments, the first set of optical components 131-140 in the excitation arm matches the second set of optical components 151-160 in the detection arm. The same scanning element 125 is used in both the excitation path and the detection path. This configuration is advantageous because it cancels out certain optical distortions that are difficult to cancel using alternative approaches. For example, if the magnification of the second set of optical components 151-160 in the detection arm is higher than the magnification of the first set of optical components 131-140 in the excitation arm, the image that appears at the tilted intermediate image plane 170 will be distorted. In some situations, however, this distortion may be acceptable or even desirable (e.g., when the differences in magnification are used to reduce the angle of the tilted intermediate image plane).

In order to capture the image that appears at the tilted intermediate image plane 170, a variety of approaches may be used. In the FIG. 1 embodiment, a magnifier is used to rotate and expand the image and route it to a light detector array (e.g., camera 190). This magnifier includes a third objective 180 and additional optical components (e.g., lens 182 and optional long pass filter 181). The light detector array (e.g., camera 190) captures images of the tilted intermediate image plane 170.

SCAPE-based systems can advantageously acquire high-quality 3D image frames at high frame rate with reasonable depth of penetration.

While the SCAPE portion of the system acquires images (e.g., as described above), an actuator 200 perturbs the sample 145. A wide variety of actuators 200 can be used for this purpose, including, for example, actuators that implement mechanical perturbation, e.g., solenoids, audio frequency transducers, ultrasound transducers, mechanical agitators, or buzzers, etc. In alternative embodiments, actuators that implement non-mechanical perturbation may be used, and the SCAPE system may be used to acquire images before, during, and after the non-mechanical perturbation. Examples of non-mechanical perturbation include, but are not limited to temperature changes, exposure to light or radiation, etc. Although FIG. 1 depicts an actuator 200 disposed off to one side of the objective 140, alternative configurations may be used. For example, a plurality of actuators may be placed on opposing sides of the objective 140, or a ring shaped actuator may be provided around the objective 140. Of course, the positioning of the actuator 200 will depend on the nature of the perturbation that is being induced by the actuator.

Images acquired using SCAPE while the actuator 200 is applying a perturbation to the tissue sample 145 can be used to quantify displacement and/or the speed of motion of features in the tissue and provide a measure of mechanical properties (e.g. Young's modulus, sheer modulus, strain, and stiffness). SCAPE can also be used to acquire more features at the micro/cellular scale that have yet to be explored (in the context of modalities such as atomic force microscopy (AFM)).

Image contrast can be provided by intrinsic fluorescence or reflectance contrast, or through introduction of fluorescent markers, beads, dyes, and other substances. Imaging of speckle variance can provide even more opportunities for characterization of mechanical and dynamic processed such as flow (relating to OCT extensions for blood flow analysis, for example).

Analysis of spatial deformations can be performed in a variety of ways, and relates also to the use of SCAPE for imaging particle flow and velocimetry for tracking dynamic 3D changes in tissue (and other substances) denoting flow and physical deformations.

Advantageously, SCAPE acquires either a complete plane of pixels having a depth direction (for embodiments that have a true sheet of light) or a complete line of pixels having a depth direction (for embodiments that have a virtual sheet of light) at any given instant. This provides a dramatic speed advantage with respect to competing technologies where only a single depth can be imaged at any given instant. This speed advantage is particularly useful for in vivo imaging, because the subject being imaged will either be moving (e.g., in the case of the heart) or at the very least, susceptible to movement. And this speed advantage is also extremely useful for imaging a sample while a perturbation is applied to the sample 145, so that the effects of the perturbation can be visualized in real time.

Figure 2:
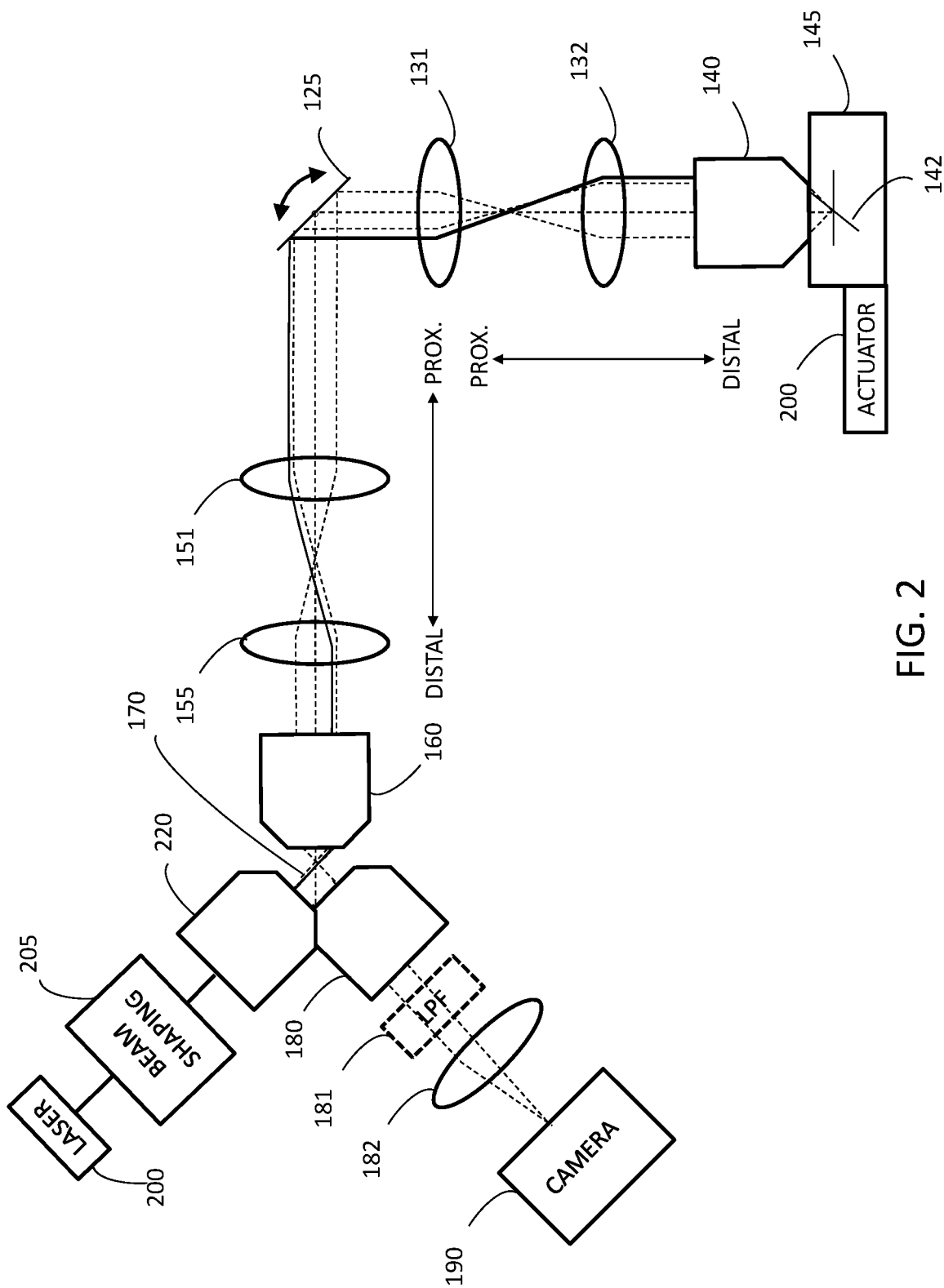
FIG. 2 is a block diagram of another SCAPE system that captures images during perturbation of a sample.

FIG. 2 is similar to the FIG. 1 embodiment, except that instead of introducing the sheet of excitation light into the system via the beam splitter 120 of FIG. 1 (which is disposed between the proximal end of the second set of optical components 151-160 and the scanning element 125), that beam splitter is omitted, and the sheet of excitation light is introduced into the system by injecting the sheet via the second objective 160 so that it passes in a distal to proximal direction through the second set of optical components 151-160.

One approach for accomplishing this, which is depicted in FIG. 2, uses a light source 200 (e.g. a laser or an LED) to generate a pencil-shaped beam of light, and beam shaping optics 205 (e.g., cylindrical lenses 110, or a Powell lens or SLM) expands that pencil-shaped beam into a sheet of excitation light. Any of the alternative approaches for forming the sheet of excitation light discussed above in connection with FIG. 1 may also be used in this FIG. 2 embodiment. The sheet of excitation light is then introduced to the fourth objective 220. The sheet of excitation light passes through a fourth objective 220 and enters the distal end of the second set of optical components 151-160. The sheet of excitation light then passes through the second set of optical components 151-160 in a distal to proximal direction until it reaches the scanning element 125. Subsequently, operation of the FIG. 2 embodiment resembles that of the FIG. 1 embodiment described above.

Section 2: SCAPE Using a Novel Image Splitter

In certain situations, it can be advantageous to capture different-colored images of the same subject simultaneously. For example, two different fluorophores (e.g., mCherry and GCaMP) may be introduced into a single sample and excited simultaneously to reveal both muscle structure and calcium dynamics, respectively.

One way to capture different-colored images of the same subject simultaneously is to use an image sensor (e.g., a CCD) with an appropriate filter (e.g., a Bayer filter) positioned over the CCD. But this solution is not suitable for microscopy, because the filter discards more than half of the incoming light, which has a very large adverse effect on the signal-to-noise ratio and NA.

Another way to capture different-colored images of the same subject simultaneously would be to use a commercially available image splitter (e.g., Optosplit II, which is sold by Andor). Referring to FIGS. 1 and 2, adding any of these commercially available image splitters to a SCAPE system requires the image splitter to be positioned between the lens 182 and the camera 190 (due to the optical design of these image splitters, which map an image plane onto a camera). But when the inventor analyzed different commercially available image splitters, each of them distorted the image and discarded a significant portion of light.

Because the intermediate image plane 170 in SCAPE systems is tilted with respect to the optical axis of the second set of optical components 151-160, SCAPE systems that use a third objective 180 aligned with the tilted intermediate image plane 170 inherently lose a large percentage of light. (This is because a large portion of the light exiting the second objective 160 in the detection arm does not enter the third objective 180, and is lost.) In view of these inherent losses, it can be advantageous (e.g., in the context of numerical aperture and signal-to-noise ratio) to minimize any further losses of light.

Figure 3:
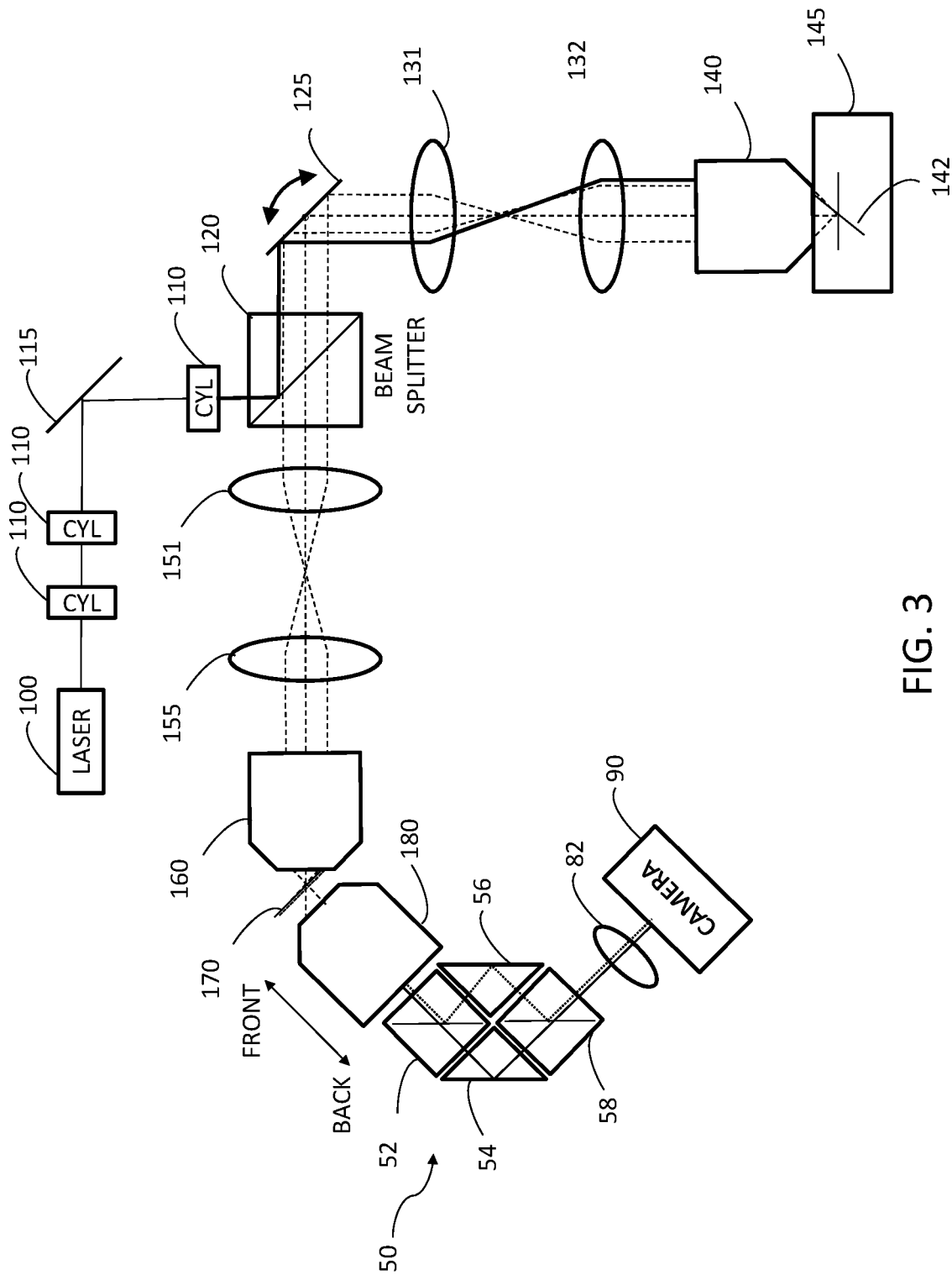
FIG. 3 is a block diagram of a SCAPE system with an image splitter that minimizes light losses.

The FIG. 3 embodiment depicts a novel approach for adding an image splitter 50 to a SCAPE system that is compatible with SCAPE and minimizes additional losses above and beyond the inherent losses described in the previous paragraph. More specifically, the FIG. 3 embodiment adds an image splitter 50 to a SCAPE system that operates synergistically with the SCAPE system to reduce the amount of distortion and to reduce the amount of light that is lost. This embodiment is useful for imaging multi-color contrast, as well as for improving degrees of freedom for alignment. In the FIG. 3 embodiment, the image splitter 50 includes components 52-58, which are discussed below.

The inventor has recognized that the light exiting the third objective lens 180 need not be formed into an image and re-mapped before being color-separated. Instead, the light can be color separated before arriving at the camera. As a result, the different colors of light will arrive at different regions on the camera's sensor, or even on separate sensors (i.e., one for each color). This simplifies the design of the image splitter greatly, so that it can be built inexpensively from available parts.

The components 100-180 of the FIG. 3 embodiment operate in the same way as the corresponding components 100-180 of the FIG. 1 and FIG. 2 embodiments. But notably, the FIG. 3 embodiment does not include a lens 182 positioned behind the third objective 180. Instead, the initial optical element of the image splitter 50 (e.g., the first beam splitter 52) is positioned immediately behind the third objective 180, i.e., in a collimated space behind the third objective 180 (a.k.a. the "infinity space" of that objective 180).

In the FIG. 3 embodiment, light exiting the back of the third objective 180 enters the beam splitter 52 without first passing through a focusing element (e.g., a lens). In this embodiment, the first beam splitter 52 is a long pass dichroic beam splitter. Incoming light is split by the first beam splitter 52, so that the longer wavelengths (shown in solid lines) pass straight through the first beam splitter 52 towards a first steering mirror 54, while the shorter wavelengths (shown in dashed lines) are redirected (e.g., reflected) towards a second steering mirror 56. The first steering mirror 54 then redirects the longer wavelengths towards a second beam splitter 58, and the second steering mirror 56 redirects the shorter wavelengths towards the second beam splitter 58. In this embodiment, the second beam splitter 58 is also a long pass dichroic beam splitter.

The longer wavelengths (shown in solid lines) arriving from the first steering mirror 54 pass straight through the second beam splitter 58 towards a lens 82; and the shorter wavelengths (shown in dashed lines) arriving from the second steering mirror 56 are redirected (e.g. reflected) by the second beam splitter 58 towards the same lens 82. Both wavelengths of light will then continue on to the camera 90.

Figure 4:
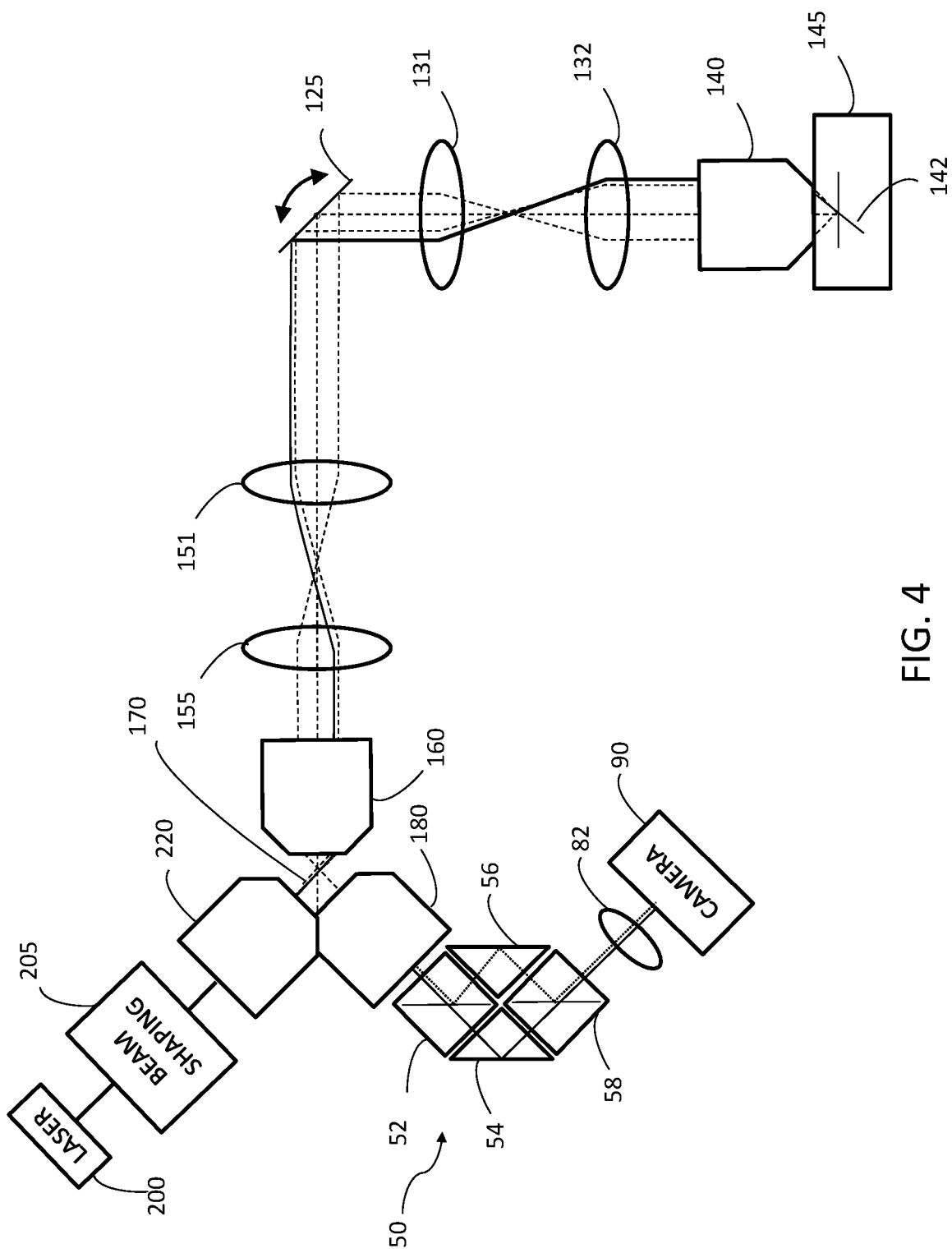
FIG. 4 is a block diagram of another SCAPE system with an image splitter that minimizes light losses.

FIG. 4 depicts an alternative embodiment that is similar to the FIG. 3 embodiment, except that instead of introducing the sheet of excitation light into the system via the beam splitter 120 of FIG. 3, that beam splitter is omitted, and the sheet of excitation light is introduced into the system by injecting the sheet via the second objective 160, as described above in connection with FIG. 2.

Note that when the optical components 52-58, 82, and 90 that follow the third objective 180 are arranged as shown in both FIGS. 3 and 4, the reflections in optical components 52-58 introduce a left turn into the path of the light before that light reaches the camera 90. In addition, the light that exits the image splitter 50 stays in a plane that is defined by (a) the optical axis of the first set of optical components 131-140 and (b) the optical axis of the second set of optical components 151-160. This plane is referred to herein as "the reference plane." Note that the light that exits the image splitter 50 may, in some cases, be steered above or below the reference plane, as discussed infra. In some embodiments, these deviations are less than 30°. In some embodiments, these deviations are less than 15°.

Figure 5:
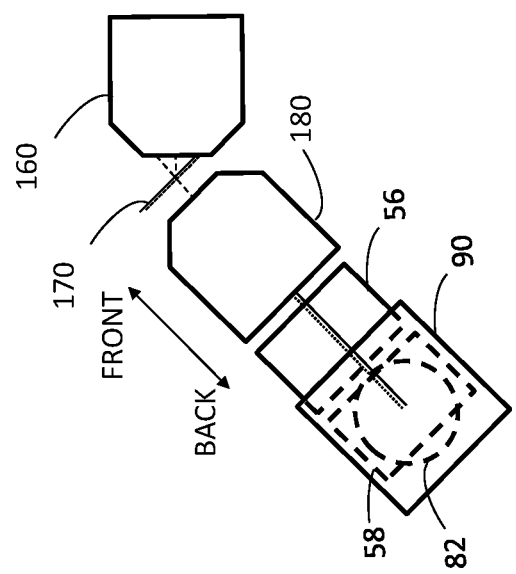
FIG. 5 depicts an alternative image splitter for the FIGS. 3 and 4 embodiments that redirects light in a direction that is perpendicular to a reference plane.

In some alternative embodiments, all of the optical components 52-58, 82, and 90 that follow the third objective 180 may be rotated by 90° about the optical axis between the tilted intermediate image plane 170 and the steering mirror 54, so that the reflections in the image splitter 50 redirect the light up out of the page (i.e., towards the reader, in a direction that is perpendicular to the reference plane) before that light reaches the camera 90 (which will be disposed between the page and the reader). This configuration is depicted in FIG. 5. (Note that elements 52 and 54 are omitted in FIG. 5 for clarity because those components are completely obscured by elements 56 and 58). Note also that deviations from true perpendicularity to the reference plane may be introduced by steering, as discussed below. In some embodiments, the light that exits the second beam splitter is perpendicular ±30°, to the reference plane. In some embodiments, the light that exits the second beam splitter is perpendicular, ±15°, to the reference plane.

In other alternative embodiments (not shown), all of the optical components 52-58, 82, and 90 that follow the third objective 180 may be rotated by 90° in the opposite direction about the optical axis between the tilted intermediate image plane 170 and the steering mirror 54, so that the reflections in the image splitter 50 redirect the light down into the page (i.e., away from the reader, in a direction that is perpendicular to the reference plane) before that light reaches the camera 90 (which will be disposed behind the page). Here again, similar deviations from true perpendicularity to the reference plane may be introduced by steering, as discussed below.

Simulations and real-world testing indicate that certain types of aberrations are minimized in those embodiments where the light that exits the image splitter 50 is either perpendicular or roughly perpendicular to the reference plane. And reducing these aberrations can make it easier to overlay the short-wavelength images that are obtained by the camera 90 with the long-wavelength images that are obtained by the camera 90.

When the steering mirrors 54 and 56 in the FIG. 3-5 embodiments are aligned, the light emanating from the second long-pass dichroic 58 for both wavelengths will be aligned at the image sensor of the camera 90. However, when the steering mirrors 54, 56 are tilted, a directional difference is introduced into the light of different wavelengths, so that the light of each wavelength will focus on two different places 91, 92 on the image sensor of the camera 90. This is illustrated in FIGS. 6A and 6B, which depict detailed views of the components disposed between the third objective 180 and the camera 90 (in the FIGS. 3 and 4 embodiments) with the steering mirrors 54, 56 tilted in different orientations, respectively.

In some embodiments, each of the two steering mirrors 54, 56 provides steerability with two degrees of freedom. If the steering mirrors 54, 56 are adjusted by rotating them about axes that are perpendicular to the page in FIG. 6B (as indicated by the curved arrows A1, A2), the long and short wavelengths of light will be focused on two different places 91, 92 on the image sensor of the camera 90, respectively, as depicted in FIG. 6B. But if the steering mirrors 54, 56 are adjusted by rotating them about axes that are vertical with respect to the page depicted in FIG. 6B (as indicated by the curved arrows B1, B2), the steering mirrors 54, 56 will steer the long and short wavelengths of light to two different positions (not shown) that are in front of and behind the page depicted in FIG. 6B, respectively.

Figure 6A:
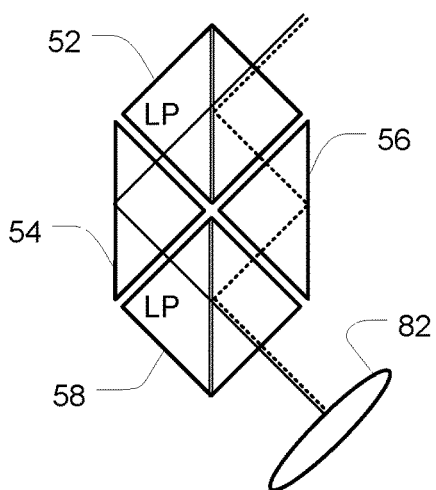
FIGS. 6A and 6B depict detailed views of the image splitter of FIGS. 3 and 4 with the steering mirrors tilted in different orientations, respectively.
Figure 6B:
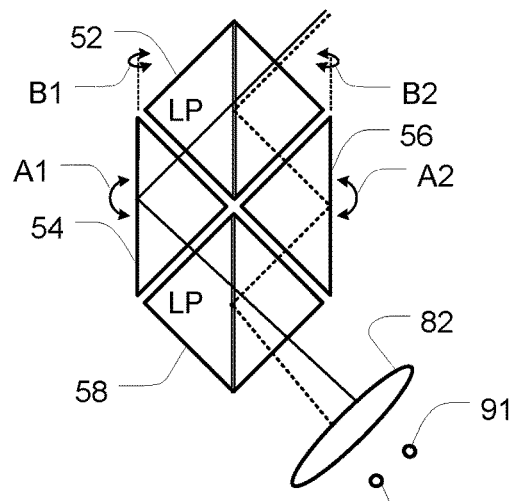

One potential complication with the FIGS. 6A/6B configuration is that changing the angle of the steering mirrors 54, 56 to move the different-wavelength images (with respect to the image sensor of the camera 90) changes the position of the light hitting the final tube lens, and this change in position can introduce aberrations. One approach for addressing this problem would be to image each mirror onto the tube lens, using additional image relay optics.

Figure 7A:
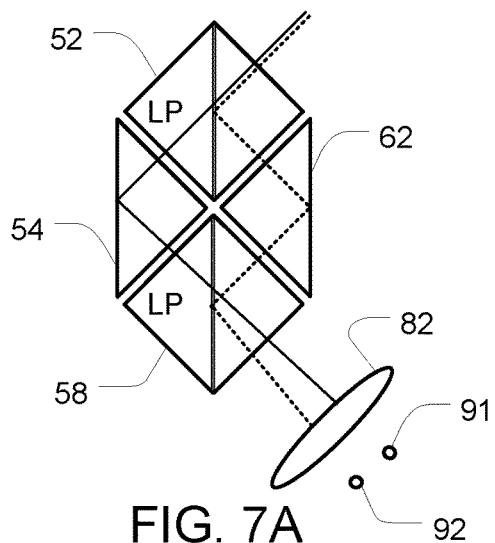
FIGS. 7A and 7B depict detailed views of a variation on the FIGS. 6A and 6B image splitter, in which a position shift is added to enable improved co-alignment.
Figure 7B:
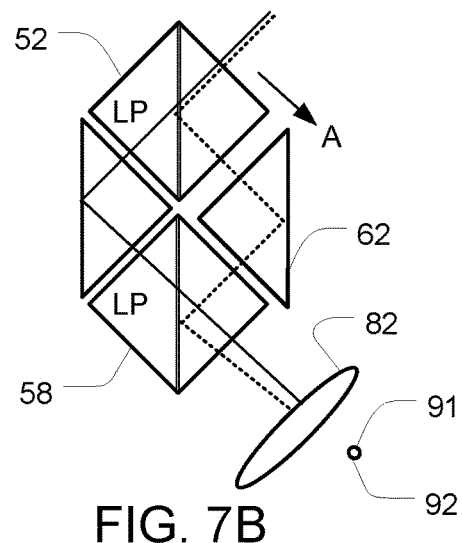

Another option is to introduce a position shift into the system to enable better co-alignment, as depicted in FIGS. 7A/B and 8A/B. Note that the image displacement is a function of beam angle-not position on the lens. As seen in these figures, the position at which the light at each of the different wavelengths will focus can be changed by moving the steering mirror 62 (i.e., adjusting the position of that mirror in direction A as opposed to the orientation) between various positions (e.g., the position depicted in FIG. 7A and the position depicted in FIG. 7B) until the focus points for the different wavelength 91, 92 move together, as depicted in FIG. 7B.

Figure 8A:
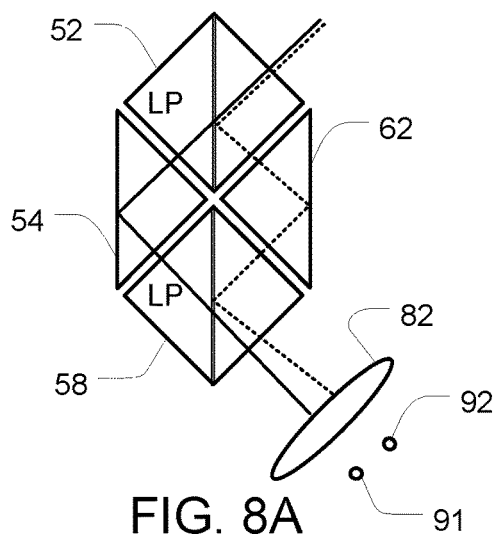
FIGS. 8A and 8B depict detailed views of the FIGS. 7A and 7B image splitter, in which the position of the incoming beam is offset.
Figure 8B:
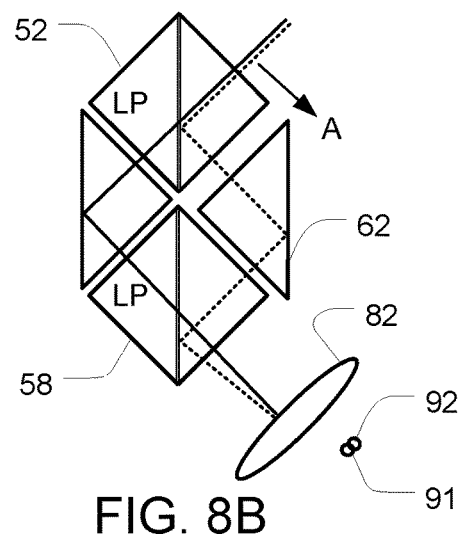

The position within the camera 90 at which the light of each of the different wavelengths will focus can also be changed by moving the point at which the light enters the first beam splitter 52. Compare, for example, the focus points 91, 92 for the paths of light depicted in FIG. 7A (which arrives at the center of the first beam splitter 52) with the paths of light depicted in FIG. 8A (which arrives offset with respect to center). Providing this additional degree of freedom can make the system more robust for re-imaging light corresponding to a partial NA of the second objective lens.

The image-splitter designs described above in connection with FIGS. 5-8 all introduce a 90° left turn in the beam (as viewed from the perspective of a photon traveling along the beam as shown in FIGS. 5-8). This 90° turn can be advantageous for achieving more compact layouts for the overall apparatus.

In alternative embodiments, if the positions of the first and second beam splitters 52, 58 and the first and second steering mirrors 54, 56 are reconfigured as shown in FIG. 9, the design will introduce a 90° right turn in the beam instead of the 90° left turn that occurs in the FIGS. 3-8 embodiments.

The embodiments described above in connection with FIGS. 3-9 assume that both of the beam splitter 52, 58 are long-pass beam splitters. But in alternative embodiments, short-pass beam splitters may be used as the first and/or second beam splitters by making appropriate modifications to the relevant geometry, as will be apparent to persons skilled in the relevant arts.

FIG. 10 depicts one such example in which a short-pass dichroic beam splitter 70 is used as the second beam splitter. The operation of this embodiment will resemble the operation of the FIGS. 3-9 embodiment described above, except that the beams that exit the second beam splitter 70 will be traveling in the same direction as the beams that enter the first beam splitter 52 (as opposed to turning 90° to the right or 90° to the left). Of course, the camera in this FIG. 10 embodiment will have to be repositioned with respect to the camera in the FIGS. 3-9 embodiments.

Optionally, any of the embodiments described above in connection with FIGS. 3-9 may be reconfigured by a mechanism that swaps various optical components in for one another (e.g. by mounting them on turrets or with alignment magnets). For example, if the long pass beam splitters 52, 58 (shown in FIG. 11A) are swapped out and replaced with solid glass optical cubes, all wavelengths of light will travel through the same optical path, forming the "bypass mode" illustrated in FIG. 11B. Because all the beam splitters are swapped out in this this bypass mode, the light is not spectrally separated and continues to the camera. But in either mode, the steering mirrors 54, 56 introduce a new degree of freedom for positioning the image/s on the camera, which is useful to ensure the central positioning required for maximum read-out speed without other misalignment.

Notably, the orientation of these steering mirrors 54, 56 may be adjusted to take advantage of the fact that the camera read out is fastest at the center of the camera chip for particular cameras (e.g., the Andor Zyla camera). In these embodiments, it is preferable to use the steering mirrors 54, 56 to re-position the image on the camera for samples where the range of depths to be imaged is different. For example, to obtain 300 rows in a thick sample, the sample can be maintained at the narrowest part of the light sheet, in which case the image can be positioned from the middle −150 to the middle +150 position on the camera chip. In another example, where a 50-row acquisition is being implemented, the image should be positioned in the middle −25 to middle +25 portion of the camera chip. In this latter situation, the image is translated up 125 rows on the camera).

FIG. 12 shows another bypass configuration that can be achieved by exchanging various optical components of the FIG. 10 embodiment. More specifically, if the first and second beam splitters 52, 70 (both shown in FIG. 10) are swapped out and replaced with a glass block 72 and a mirror 76, respectively, then the light that exits the final component 76 will be traveling down in the same direction as it is in FIG. 10, but the light will not be spectrally separated before reaching the camera.

Note that the embodiments described above in connection with FIGS. 3-12 assume that the camera 90 has a single image sensor chip, in which case the light of each wavelength will focus on two different places on that single image sensor. But in alternative embodiments, two separate image sensor chips may be used, along with additional optical elements (not shown) to route the wavelength-separated light on to respective image sensor chips.

Section 3: SCAPE Using Wide-Field Illumination Imaging

A SCAPE microscope can be used with widefield illumination to acquire a stack of images by collecting in-focus images in multiple planes using the descanning component (mirror, SLM, or other device) to scan through a sample. Deconvolution microscopy method may be used to develop a computed model of the entire three-dimensional sample using from in-focus and out-of-focus light according to known techniques for deconvolution microscopy. Thus, using SCAPE, an approach similar to deconvolution microscopy is achieved, either by reflectance imaging or by flood illuminating the sample and acquiring images as the in-focus plane sweeps through the sample. This yields images equivalent to conventional deconvolution microscopy.

Signal is acquired from out of plane structure and the contribution of the out of plane regions is computationally reconstructed from the full set of signals from all plane regions. SCAPE allows deconvolution to be done without translating the sample and full stacks sample planes can be acquired rapidly, stored and generate 3D static or 3D image sequences computed from the full data set of one or more scans. Also in combination with fluorescence (or Raman, second harmonic generation or other) contrast imaging, SCAPE can provide complementary information about the structure of the sample, and permit attenuation correction. In some embodiments, an excitation beam may also be scanned simultaneously to generate fluorescence, and the wavelengths of the fluorescent excitation output may be separated by wavelength to different imaging detectors or regions of a single imaging detector.

Section 4: Options for and Benefits of SCAPE

Photodynamics:

SCAPE's ability to image fast in 3D brings the ability to image dynamics of things like photobleaching or phosphorescent decays over times fast enough to characterize properties throughout a volume. Such measurements may optionally be limited to single sites. These can be applied to techniques such as FRAP (fluorescence recovery after photobleaching) and measurements of chemical binding and conformational changes.

Strobed Illumination to Reduce Photodamage:

Depending on the type of camera acquisition strategy, there can be times that the camera is not exposing (both for SCAPE but also for standard light sheet imaging geometries such as SPIM). Illuminating the sample during these periods will add to photodamage/phototoxicity which can be a concern for imaging in living specimens. The availability of modulateable lasers (and fast shutter systems/pockel cells) provides the opportunity to synchronize all laser illumination only to times when the camera chip is exposing, thereby minimizing photodamage.

Non-Fluorescent Imaging:

SCAPE can also be advantageously combined with non-fluorescence contrast imaging. Imaging reflectance in the near infrared can provide back-scattered information and absorption contrast deep into tissues can provide structural and dynamic information. Simultaneous reflectance and transmittance imaging can be achieved using an image splitter. This combination can be used to add value for imaging the structure of tissues as well as functional contrast such as calcium-sensitive fluorophores.

Incoherent Light Imaging:

Traditional SCAPE and light sheet methods use laser illumination. This can make alignment easier, but brings limitations on the wavelengths available, high cost, stability, and can result in speckles in illumination which add noise and heterogeneity. This effect also makes it more difficult to image reflectance contrast.

The inventor has recognized, that there is nothing about light-sheet that fundamentally requires coherent light, and that it is possible to use incoherent light, such as light emitting diode (LED) sources. This would afford a wider range of versatile wavelength, modulation, and illumination strategies, as well as the ability to have no speckle. Removing the effects of speckle, particularly for reflectance/flood illumination approaches described above would provide significant benefits. The challenge is to be able to properly shape and condition incoherent light (such as from an LED) into a well-formed light sheet. One approach for generating a well-formed light sheet from LED illumination is to use conventional optics. Another approach is to use a spatial light modulator (SLM) or digital micromirror array (DMA). Yet another approach is to combine conventional optics with an SLM/DMA.

PCT/US17/34945, which is incorporated herein by reference, describes a variety of approaches for engineering an improved light sheet illumination and the ability to pattern the excitation point spread function. Combining those approaches with incoherent light sources can be beneficial.

Although some features of phase correction of a spatial light modulator would be ineffective on incoherent light, a spatial light modulator or DMD can be readily used to ensure that a more precisely collimated beam is formed from poorly collimated LED light. The device could also change the NA of the light sheet and the lateral extent and intensity profile of the sheet at the sample, optimizing for resolution, phototoxicity and field of view.

Using either coherent or incoherent light, the lateral location of the beam can be altered to alter the position of the beam entering the objective lens, and thus the angle of the beam thereby enabling closed-loop, digital optimization of image rotation alignment. An SLM/DMD can also be used to shape the excitation light to account for aberrations in sheet formation caused by forming the sheet through the side of the primary objective lens.

In some embodiments, the light sheet may be optimized by creating a more ideal light sheet at the input of the second objective at the intermediate oblique image plane. In this case, the symmetry of the primary and second objective lens would account for aberrations in sheet formation encountered when forming the sheet as described above. Although this approach could be used in SCAPE, a spatial light modulator could be used to pre-correct light forming the sheet to account for these aberrations to ensure formation of a higher quality sheet at the sample. A suitably fast SLM could even account for changes in sheet quality during SCAPE scanning of the sheet. Corrections could be optimized in a closed-loop fashion, seeking correction of incoming light that results in the most focused, brightest, or otherwise improved image on the SCAPE camera.

Optional Features:

In any of the embodiments described above, the Numerical Aperture (NA) of light sheet and the number of rows on the camera that are being used can be adjusted to "zoom in" on small samples, or "zoom out" for large samples. A variable objective may be used for these embodiments. Some of these embodiments are configured to maintain a modest (high NA) magnification.

In any of the embodiments described above, An SLM may be used to permit adjustment of NA without moving parts and allow adjustment of line width and patterned illumination. Aberration correction of light sheet may also be corrected by using an SLM. In some embodiments, alignment of the light sheet may be implemented through translation and adjusting of tilt at the light sheet source, rather than on detection side.

In some embodiments, a block of fluorinated ethylene propylene (FEP) may be used instead of maintaining water immersion in an inverted plate reader configuration.

In some embodiments, a "dwell" mode may be provided for translation-based scanning of large samples e.g. cleared tissues using a system for image rotation, similar to those disclosed in U.S. Pat. No. 8,582,203. Focusing similar to the approach described in that patent may be done on lossy image rotation.

In some embodiments, white light illumination may be used. In some embodiments, optical projection tomography (OPT) may be used.

In some embodiments, resolution may be traded off for speed. For example, cell biology microscopic applications can tolerate lower speed in exchange for higher resolution (similar to confocal performance); while neuroscience applications would tolerate lower resolution in exchange for higher speed.

In some embodiments, SCAPE systems may be implemented with multiple modes. For example, a low-power mode that uses a low laser power (e.g., 0.05 mW) and a long camera integration time (e.g., 100 ms) for looking for the sample target. A "high res scan" mode may permit stopping at many positions across the sample, and a "fast scan" mode such as described in the SCAPE high speed scanning description in US 2016/0327779 may also be provided.

SCAPE may also be implemented using two cameras rather than an image splitter. Two cameras would be burdensome to a computer and require synchronization between the cameras—which can slow for acquisition and would bring more potential for differences in the cameras to be a problem, for example, rotation, magnification etc. Merging images from multiple cameras is possible. There is no loss in speed to acquire two or more multi-spectral images side by side and read them out together. In some embodiments, simultaneous dual color imaging may be implemented, for example in cell tracking and gcamp ratiometric imaging on moving targets such as crawling Drosophila larvae.

In any of the foregoing embodiments, the light source (laser or other) may be selected for excitation of natural fluorophores or fluorophores introduced for contrast enhancement. Examples of fluorescent contrast agents include Fluorescein, Sulforhodamine 101, proflavin and Methylene blue. In the various embodiments, the light for imaging may be one or a combination of fluorescent light from sources excited by the excitation light from the identified light source or reflected or scattered light.

Optionally, for any of the embodiments described herein, steering mirrors may be used to re-position the image to the middle portion of the camera chip, as described above in connection with the example involving the Andor Zyla camera.

Avoiding the use of a conventional microscope base:

In some embodiments, the use of a conventional microscope base is avoided. This provides a number of advantages including (1) facilitating switching between inverted and upright configurations, which may be important in some multi-user systems; (2) avoiding user confusion regarding the expectation of using a turret; (3) avoiding eyepieces that may impose ergonomic constraints on the rest of the system; (4) reducing the cost, size, weight, and bulk to the system; and (5) facilitating the incorporation of diverse behavioral rigs and the ability to use the system on unconventional samples. Examples include the use of a standardized mechanical or electronic x-y-z stage for sample positioning, which would also allow a "confocal mode" acquisition of stacks etc.

It is desirable to provide users with a way to find their sample, and DIC (Differential interference contrast) is not useful for intact/in-vivo samples. There are other ways to visualize/find a sample even with LED based illumination. The SCAPE camera itself shows the field of view (albeit with skewed focus) but this is quite sufficient. In some embodiments, another camera for sample visualization could be positioned on the opposite side of the turning mirror that is provided above the objective (such that the mirror is a dichroic and red/NIR light is used to monitor the sample, even during acquisition of SCAPE data). A sample visualization camera could be placed virtually anywhere within the relay lens light path to provide a proper epi-view of the sample through the use of a dichroic (or other component that could be inserted etc.). Optionally, an iPad or inexpensive screen/touchscreen located close to the sample could permit control of the instrument and real-time display of images equivalent to the eyepieces. It should be noted that for fluorescence, digital preview is far better than preview with the eye since much lower light levels can be used, thus avoiding photodamage.

In some embodiments, regarding the light illumination path, it may be desirable to provide the ability to realign the light sheet to the camera detection plane without needing to actually move the camera. This function could be automated using a motorized device (stage or other depending on the implementation), perhaps using closed-loop optimization of image features with a bead or similar sample under the primary objective. An SLM/DMD or similar as part of the light sheet may be employed as discussed in the WO 2015/109323 and US 2016/0327779. This could bring additional benefits including aberration correction, the ability to adjust the NA of the light sheet (again, this can allow "zooming" into regions with higher optical resolution within the same sample that can also be imaged at lower resolution—with and without use of variable magnification on the detection arm). This would avoid diffraction patterns caused by using a slit. The light sheet may be engineered to be optimized beyond using a Gaussian beam and this need not necessarily use Bessel beams. It may be important to be able to adjust the line length of the sheet, out to perhaps 1 mm, but also permitting reduction of the sheet to avoid excess sample illumination if a smaller field of view was desired (this may also be important when using image splitting across the chip). This configuration could also afford the opportunity to adjust the sheet angle, and/or relative position etc., optionally in a closed-loop fashion. These may be achieved with other optical components such as, and including, variable apertures, and moving mirrors.

It is attractive to have the camera positioning static and unmovable. However, this brings the risk of misalignment with the primary objective path. Although the camera angle can be fixed owing to the degrees of freedom for light sheet alignment, in cases where the primary light path or camera do shift, relying on adjustment of the light sheet launch could iterate the system into an undesirable configuration. For example, the light sheet could wander to the edge or center of the objective lens, either losing light or changing the properties of the light sheet, crossing angle and scan pattern. Providing some way to adjust the camera with respect to the primary objective light path may be preferable, along with a protocol for this alignment. In some embodiments, the camera positioning may be adjusted as discussed in US 2016/0327779, which is incorporated herein by reference.

It will be appreciated that the modules, processes, systems, and sections described above can be implemented in hardware, hardware programmed by software, software instruction stored on a non-transitory computer readable medium or a combination of the above. For example, a method for controlling the scanning and de-scanning elements and for sampling and storing image data and for constructing three-dimensional models from the image data can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, Lab VIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control systems, optics, digital data filtering, optical sensor systems and/or computer programming arts.

Moreover, embodiments of the disclosed method, system, and computer program product can be implemented in software executed on a programmed general-purpose computer, a special purpose computer, a microprocessor, or the like.

It is, thus, apparent that there is provided, in accordance with the present disclosure, SCAPE-based imaging system. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. An imaging apparatus comprising:
a first set of optical components having a proximal end and a distal end, wherein the first set of optical components includes a first objective disposed at the distal end of the first set of optical components;
a second set of optical components having a proximal end and a distal end, wherein the second set of optical components includes a second objective disposed at the distal end of the second set of optical components;
a scanning element that is disposed proximally with respect to the proximal end of the first set of optical components and proximally with respect to the proximal end of the second set of optical components,
wherein the scanning element is arranged to route a sheet of excitation light so that the sheet of excitation light will pass through the first set of optical components in a proximal to distal direction and project into a sample that is positioned distally beyond the distal end of the first set of optical components, wherein the sheet of excitation light is projected into the sample at an oblique angle, and wherein the sheet of excitation light is projected into the sample at a position that varies depending on an orientation of the scanning element,
wherein the first set of optical components routes detection light from the sample in a distal to proximal direction back to the scanning element, and
wherein the scanning element is also arranged to route the detection light so that the detection light will pass through the second set of optical components in a proximal to distal direction and form an intermediate image plane at a position that is distally beyond the distal end of the second set of optical components;
a third objective arranged to route light arriving from the intermediate image plane to an infinity space, wherein the intermediate image plane is disposed in front of the third objective and the infinity space is disposed behind the third objective;
a first beam splitter positioned in the infinity space, wherein the first beam splitter is arranged to route light from the intermediate image plane having a first wavelength in a first direction and to route light from the intermediate image plane having a second wavelength in a second direction, wherein the second direction is different from the first direction and wherein the first wavelength is longer than the second wavelength;
a first light detector array arranged to capture first-wavelength images;
a second light detector array arranged to capture second-wavelength images; and
a third set of optical components arranged to route the light having the first wavelength that exits the first beam splitter towards the first light detector array and route the light having the second wavelength that exits the first beam splitter towards the second light detector array.

2. The apparatus of claim 1, wherein the third set of optical components includes:
a second beam splitter;
a first steering mirror arranged to route the light having the first wavelength that exits the first beam splitter into the second beam splitter;
a second steering mirror arranged to route the light having the second wavelength that exits the first beam splitter into the second beam splitter; and
at least one lens disposed between (a) the second beam splitter and (b) the first and second light detector arrays,
wherein the second beam splitter is arranged to route light arriving from the first and second steering mirrors towards the at least one lens, and
wherein the first beam splitter comprises a long-pass dichroic element that passes light at the first wavelength without diverting its path, and redirects light at the second wavelength in the second direction, and
wherein the second beam splitter comprises a long-pass dichroic element that passes light at the first wavelength without diverting its path, and redirects light at the second wavelength arriving from the second steering mirror towards the at least one lens, and
wherein each of the first beam splitter and the second beam splitter are implemented in a respective movable module, and
wherein the apparatus further comprises (i) a first optical block, (ii) a mechanism for moving the first beam splitter out of a first optical path and moving the first optical block into the first optical path; (iii) a second optical block, and (iv) a mechanism for moving the second beam splitter out of a second optical path and moving the second optical block into the second optical path.

3. The apparatus of claim 1, wherein the third set of optical components includes:
a second beam splitter;
a first steering mirror arranged to route the light having the first wavelength that exits the first beam splitter into the second beam splitter;
a second steering mirror arranged to route the light having the second wavelength that exits the first beam splitter into the second beam splitter; and
at least one lens disposed between (a) the second beam splitter and (b) the first and second light detector arrays, and
wherein the second beam splitter is arranged to route light arriving from the first and second steering mirrors towards the at least one lens, and
wherein the first beam splitter comprises a long-pass dichroic element that passes light at the first wavelength without diverting its path, and redirects light at the second wavelength in the second direction, and
wherein the second beam splitter comprises a short-pass dichroic element that passes light at the second wavelength without diverting its path, and redirects light at the first wavelength arriving from the first steering mirror towards the at least one lens, and
wherein each of the first beam splitter and the second beam splitter are implemented in a respective movable module, and
wherein the apparatus further comprises (i) a first optical block, (ii) a mechanism for moving the first beam splitter out of a first optical path and moving the first optical block into the first optical path; (iii) a second optical block comprising a mirror, and (iv) a mechanism for moving the second beam splitter out of a second optical path and moving the second optical block into the second optical path.

4. The apparatus of claim 1, wherein the third set of optical components includes:
a second beam splitter;
a first steering mirror arranged to route the light having the first wavelength that exits the first beam splitter into the second beam splitter;
a second steering mirror arranged to route the light having the second wavelength that exits the first beam splitter into the second beam splitter; and
at least one lens disposed between (a) the second beam splitter and (b) the first and second light detector arrays,
wherein the second beam splitter is arranged to route light arriving from the first and second steering mirrors towards the at least one lens, and
wherein light that exits the second beam splitter is perpendicular, ±30°, to a plane defined by (a) an optical axis of the first set of optical components and (b) an optical axis of the second set of optical components.

5. The apparatus of claim 1, wherein the third set of optical components includes:
a second beam splitter;
a first steering mirror arranged to route the light having the first wavelength that exits the first beam splitter into the second beam splitter;
a second steering mirror arranged to route the light having the second wavelength that exits the first beam splitter into the second beam splitter; and
at least one lens disposed between (a) the second beam splitter and (b) the first and second light detector arrays,
wherein the second beam splitter is arranged to route light arriving from the first and second steering mirrors towards the at least one lens, and
wherein light that exits the second beam splitter is perpendicular, ±15°, to a plane defined by (a) an optical axis of the first set of optical components and (b) an optical axis of the second set of optical components.

6. An imaging apparatus comprising:
an optical system that (a) projects a sheet of excitation light into a sample at an oblique angle, wherein a position of the sheet of excitation light within the sample varies depending on an orientation of a scanning element, and (b) forms, from detection light that originates from the position of the sheet of excitation light, an image at an intermediate image plane, wherein the intermediate image plane remains stationary regardless of the orientation of the scanning element;
a third objective arranged to route light arriving from the intermediate image plane to an infinity space, wherein the intermediate image plane is disposed in front of the third objective and the infinity space is disposed behind the third objective;
a first beam splitter positioned in the infinity space, wherein the first beam splitter is arranged to route light from the intermediate image plane having a first wavelength in a first direction and to route light from the intermediate image plane having a second wavelength in a second direction, wherein the second direction is different from the first direction and wherein the first wavelength is longer than the second wavelength;
a first light detector array arranged to capture first-wavelength images;
a second light detector array arranged to capture second-wavelength images; and
a third set of optical components arranged to route the light having the first wavelength that exits the first beam splitter towards the first light detector array and route the light having the second wavelength that exits the first beam splitter towards the second light detector array.

7. The apparatus of claim 6, wherein the first light detector array and the second light detector array are implemented on separate regions of a single light detector chip.

8. The apparatus of claim 6, wherein the third set of optical components includes:
a second beam splitter;
a first steering mirror arranged to route the light having the first wavelength that exits the first beam splitter into the second beam splitter;
a second steering mirror arranged to route the light having the second wavelength that exits the first beam splitter into the second beam splitter; and
at least one lens disposed between (a) the second beam splitter and (b) the first and second light detector arrays,
wherein the second beam splitter is arranged to route light arriving from the first and second steering mirrors towards the at least one lens.

9. The apparatus of claim 8, wherein the first beam splitter comprises a long-pass dichroic element that passes light at the first wavelength without diverting its path, and redirects light at the second wavelength in the second direction, and
wherein the second beam splitter comprises a long-pass dichroic element that passes light at the first wavelength without diverting its path, and redirects light at the second wavelength arriving from the second steering mirror towards the at least one lens.

10. The apparatus of claim 9, wherein each of the first beam splitter and the second beam splitter are implemented in a respective movable module, and wherein the apparatus further comprises (i) a first optical block, (ii) a mechanism for moving the first beam splitter out of a first optical path and moving the first optical block into the first optical path; (iii) a second optical block, and (iv) a mechanism for moving the second beam splitter out of a second optical path and moving the second optical block into the second optical path.

11. The apparatus of claim 8, wherein the first beam splitter comprises a long-pass dichroic element that passes light at the first wavelength without diverting its path, and redirects light at the second wavelength in the second direction, and wherein the second beam splitter comprises a short-pass dichroic element that passes light at the second wavelength without diverting its path, and redirects light at the first wavelength arriving from the first steering mirror towards the at least one lens.

12. The apparatus of claim 11, wherein each of the first beam splitter and the second beam splitter are implemented in a respective movable module, and wherein the apparatus further comprises (i) a first optical block, (ii) a mechanism for moving the first beam splitter out of a first optical path and moving the first optical block into the first optical path; (iii) a second optical block comprising a mirror, and (iv) a mechanism for moving the second beam splitter out of a second optical path and moving the second optical block into the second optical path.

13. The apparatus of claim 8, wherein at least one of the first and second steering mirrors has an orientation that is adjustable.

14. The apparatus of claim 13, wherein at least one of the first and second steering mirrors has a position that is adjustable.

15. The apparatus of claim 14, wherein the first light detector array and the second light detector array are implemented on separate regions of a single light detector chip.

16. The apparatus of claim 8, wherein light that exits the second beam splitter deviates by less than 15° from a plane defined by (a) an optical axis of the excitation light and (b) an optical axis of the detection light.

17. The apparatus of claim 8, wherein light that exits the second beam splitter is perpendicular, ±30°, to a plane defined by (a) an optical axis of the excitation light and (b) an optical axis of the detection light.

18. The apparatus of claim 8, wherein light that exits the second beam splitter is perpendicular, ±15°, to a plane defined by (a) an optical axis of the excitation light and (b) an optical axis of the detection light.

19. The apparatus of claim 8, wherein each of the first beam splitter and the second beam splitter are implemented in a respective removable magnetically-mounted module.

20. The apparatus of claim 6, wherein the first beam splitter is implemented in a removable magnetically-mounted module.

* * * * *